(12) United States Patent
Kimpara et al.

(10) Patent No.: US 11,820,479 B2
(45) Date of Patent: Nov. 21, 2023

(54) BOAT PROPULSION MACHINE

(71) Applicant: SUZUKI MOTOR CORPORATION, Hamamatsu (JP)

(72) Inventors: Masatoshi Kimpara, Hamamatsu (JP); Yasushi Miyashita, Hamamatsu (JP); Shingo Matsumoto, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 233 days.

(21) Appl. No.: 17/403,529

(22) Filed: Aug. 16, 2021

(65) Prior Publication Data
US 2022/0055728 A1 Feb. 24, 2022

(30) Foreign Application Priority Data
Aug. 19, 2020 (JP) .................. 2020-138486

(51) Int. Cl.
*B63H 20/28* (2006.01)
*B63H 20/32* (2006.01)

(52) U.S. Cl.
CPC ............. *B63H 20/28* (2013.01); *B63H 20/32* (2013.01); *B63H 2020/323* (2013.01)

(58) Field of Classification Search
CPC ........ B63H 20/38; B63H 5/125; B63H 11/08; B63H 20/14; B63H 20/32; B63H 23/24; B63H 21/17; F01P 3/202
See application file for complete search history.

(56) References Cited

U.S. PATENT DOCUMENTS

| | | | | |
|---|---|---|---|---|
| 2002/0108587 A1* | 8/2002 | Nagashima | ............... | F02F 1/10 123/41.72 |
| 2002/0197920 A1* | 12/2002 | Nakata | ................. | B63H 20/285 440/88 L |
| 2019/0249590 A1* | 8/2019 | Li | ......................... | B63H 21/383 |
| 2019/0271255 A1* | 9/2019 | Coller | .................... | B63H 20/28 |

FOREIGN PATENT DOCUMENTS

JP 2005-153727 A 6/2005

* cited by examiner

*Primary Examiner* — Syed O Hasan
(74) *Attorney, Agent, or Firm* — Stein IP, LLC

(57) ABSTRACT

A boat propulsion machine includes a power source, a drive shaft, a propeller, a gear mechanism, a gear case, a tank configured to store a cooling liquid for cooling the power source, a heat sink configured to cool the cooling liquid, a cooling liquid passage connecting the power source and the heat sink, and a pump a pump configured to pump the cooling liquid to circulate through the cooling liquid passage. The power source, the tank, and the pump are provided at an upper portion of the boat propulsion machine. The gear case is provided at a lower portion of the boat propulsion machine. The drive shaft extends in an upper-lower direction between the power source and the gear mechanism. The heat sink is provided at a position lower than the power source and higher than the gear case in the boat propulsion machine.

7 Claims, 8 Drawing Sheets

BOAT PROPULSION MACHINE

CROSS-REFERENCE TO RELATED APPLICATIONS

This application is based on Japanese Patent Application No. 2020-138486 filed on Aug. 19, 2020, the contents of which are incorporated herein by way of reference.

TECHNICAL FIELD

The present invention relates to a boat propulsion machine including a cooling device for cooling a power source.

BACKGROUND ART

A boat propulsion machine such as an outboard motor or an inboard/outboard motor includes a power source such as an engine as an internal combustion engine or an electric motor. Such a power source generates heat during operation. Therefore, for many boat propulsion machines, a cooling device for cooling the power source is provided.

In a boat propulsion machine having a structure in which a power source is disposed above a water surface, a gear case (also referred to as a "lower case") in which a propeller and a gear mechanism are provided is disposed below the water surface, and the power source and the gear mechanism in the gear case are connected to each other via a drive shaft, a cooling device using a cooling liquid such as cooling water or oil may be adopted. Patent Literature 1 describes an outboard motor including such a cooling device.

The cooling device in the outboard motor described in Patent Literature 1 includes a water jacket provided around an electric motor which is disposed above the water surface as a power source, a cooling water pump provided in the lower case disposed below the water surface, and a cooling water pipe connecting the water jacket and the cooling water pump. Further, the lower case is provided with a water intake for taking in external water.

In the cooling device, the cooling water pump takes in external water from the water intake as cooling water, and pressure-feeds the cooling water to the water jacket via the cooling water pipe. The cooling water flows in the water jacket to cool the electric motor. The cooling water is discharged to the outside after cooling the electric motor.

Patent Literature 1: JP-A-2005-153727

SUMMARY OF INVENTION

In the boat propulsion machine, it is desirable to reduce resistance of water during navigation of the boat and improve the navigation performance of the boat by downsizing or slimming the gear case (lower case). In particular, in a low-output boat propulsion machine using an electric motor as a power source, downsizing or slimming of a gear case greatly contributes to improvement of the navigation performance.

However, in the outboard motor described in Patent Literature 1, a part of the cooling device is disposed in the lower case (gear case). Specifically, the cooling water pump is disposed in the lower case, and a lower end side of the cooling water pipe enters the lower case. As a result, it is difficult to downsize or slim the lower case.

Further, in the boat propulsion machine, in order to enable maintenance or the like of the gear mechanism or the propeller provided in the gear case, it is desirable to facilitate detachment of the gear case from the boat propulsion machine and attachment of the gear case to the boat propulsion machine.

However, in the outboard motor described in Patent Literature 1, since a part of the cooling device is disposed in the lower case (gear case), it is not easy to detach the lower case from the boat propulsion machine or to attach the lower case to the boat propulsion machine. For example, when the lower case is to be detached from the boat propulsion machine, an operation of disconnecting the cooling water pipe and the cooling water pump is required, or when the lower case is to be attached to the boat propulsion machine, an operation of connecting the cooling water pipe and the cooling water pump is required.

The present invention has been made in view of, for example, the above-described problems, and an object of the present invention is to provide a boat propulsion machine in which a gear case can be downsized or slimed to improve the navigation performance, or the gear case can be easily attached to or detached from the boat propulsion machine.

In order to solve the above problems, there is provided a boat propulsion machine that propels a boat, including: a power source; a drive shaft configured to be rotated by power of the power source; a propeller configured to generate a propulsive force for propelling the boat; a gear mechanism configured to transmit rotation of the drive shaft to the propeller; a gear case accommodating the gear mechanism and rotatably supporting the propeller; a tank configured to store a cooling liquid for cooling the power source; a heat sink configured to cool the cooling liquid; a cooling liquid passage connecting the power source and the heat sink such that the cooling liquid circulates between the power source and the heat sink; and a pump configured to pump the cooling liquid to circulate through the cooling liquid passage between the power source and the heat sink, wherein the power source, the tank, and the pump are provided at an upper portion of the boat propulsion machine, the gear case is provided at a lower portion of the boat propulsion machine, the drive shaft extends in an upper-lower direction between the power source and the gear mechanism, and the heat sink is provided at a position lower than the power source and higher than the gear case in the boat propulsion machine.

DESCRIPTION OF EMBODIMENTS

Figure 1:
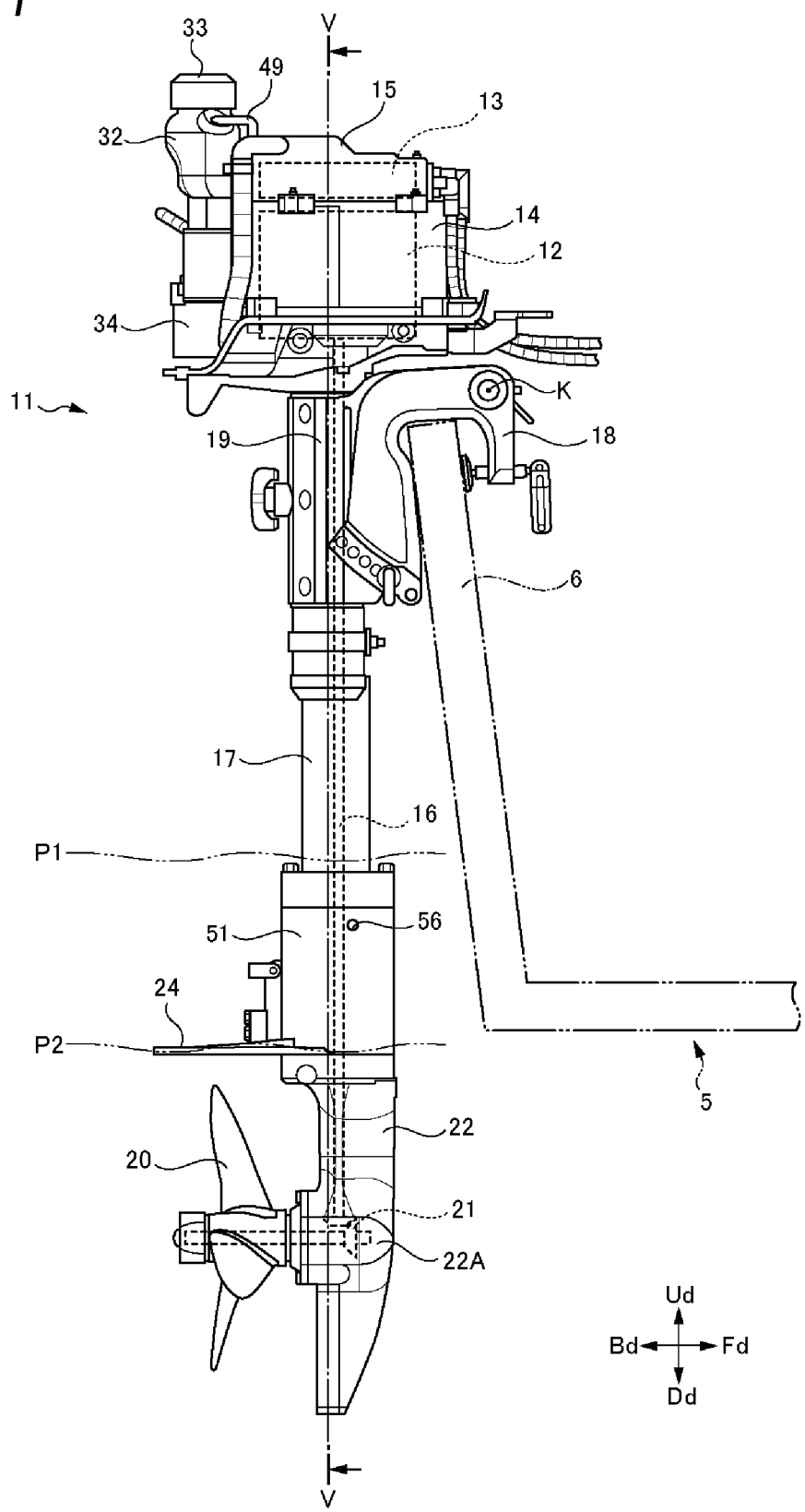
FIG. 1 is a main part external view showing an outboard motor which is an embodiment of a boat propulsion machine according to the present invention as viewed from the right.

A boat propulsion machine according to an embodiment of the present invention includes a power source, a drive shaft to be rotated by power of the power source, a propeller which generates a propulsive force for propelling a boat, a gear mechanism which transmits rotation of the drive shaft to the propeller, and a gear case which accommodates the gear mechanism and rotatably supports the propeller.

Further, the boat propulsion machine according to the embodiment of the present invention includes, as a cooling device which cools the power source, a tank which stores a cooling liquid for cooling the power source, a heat sink which cools the cooling liquid, a cooling liquid passage which connects the power source and the heat sink such that the cooling liquid circulates between the power source and the heat sink, and a pump which pumps the cooling liquid to circulate through the cooling liquid passage between the power source and the heat sink.

The cooling liquid stored in the tank is supplied to the cooling liquid passage when the cooling liquid is insufficient. The cooling liquid supplied to the cooling liquid passage circulates between the power source and the heat sink by an operation of the pump. The heat sink preferably has a configuration in which a passage through which the cooling liquid flows is provided in a case made of a material excellent in heat dissipation, such as aluminum.

In the boat propulsion machine according to the embodiment of the present invention, the power source, the tank, and the pump are provided at an upper portion of the boat propulsion machine and are located above a water surface. Further, the gear case which accommodates the gear mechanism and rotatably supports the propeller is provided in a lower portion of the boat propulsion machine and is located below the water surface. The drive shaft extends in an upper-lower direction between the power source and the gear mechanism. The heat sink is provided in the boat propulsion machine at a position lower than the power source and higher than the gear case.

A part of the boat propulsion machine which is lower than the power source and higher than the gear case is located such that at least a lower portion of the part is located below a water surface when the boat stops or when the boat navigates at a low speed, and most of the part or the entire part is located above the water surface when the boat navigates at a high speed. However, even when an entire of the part of the boat propulsion machine which is lower than the power source and higher than the gear case is located above the water surface when the boat navigates at a high speed, the part is at a position close to the water surface and splashed with water.

In the boat propulsion machine, by providing the heat sink at a part lower than the power source and higher than the gear case, the heat sink can be cooled by water around the boat, and thus the cooling liquid flowing in the heat sink can be cooled.

In the boat propulsion machine according to the embodiment of the present invention, the heat sink is provided at a part higher than the gear case. The tank and the pump are provided at the upper portion of the boat propulsion machine. The cooling liquid passage connecting the power source and the heat sink is located at a part higher than the gear case. That is, none of the heat sink, the tank, the pump, and the cooling liquid passage which configure the cooling device is provided in the gear case. Therefore, the gear case can be downsized or slimed, and thus the navigation performance of the boat can be improved.

Further, since none of the heat sink, the tank, the pump, and the cooling liquid passage which configure the cooling device is provided in the gear case, there is no need to disassemble a part of the cooling device when the gear case is to be detached from the boat propulsion machine, and there is no need to assemble a part of the cooling device when the gear case is to be attached to the boat propulsion machine. Therefore, the gear case can be easily attached to and detached from the boat propulsion machine, and an operation such as maintenance of the gear mechanism or the propeller provided in the gear case can be simplified.

[Embodiment]

Hereinafter, an outboard motor which is an embodiment of the boat propulsion machine of the present invention will be described with reference to the drawings. In description of the embodiment, upper (Ud), lower (Dd), front (Fd), rear (Bd), left (Ld), and right (Rd) directions are based on upper, lower, front, rear, left, and right directions of a person who is on board a boat to which the outboard motor is attached and who faces a forward direction of the boat. Arrows drawn on the lower right in each drawing indicate these directions.

(Outboard Motor)

Figure 2:
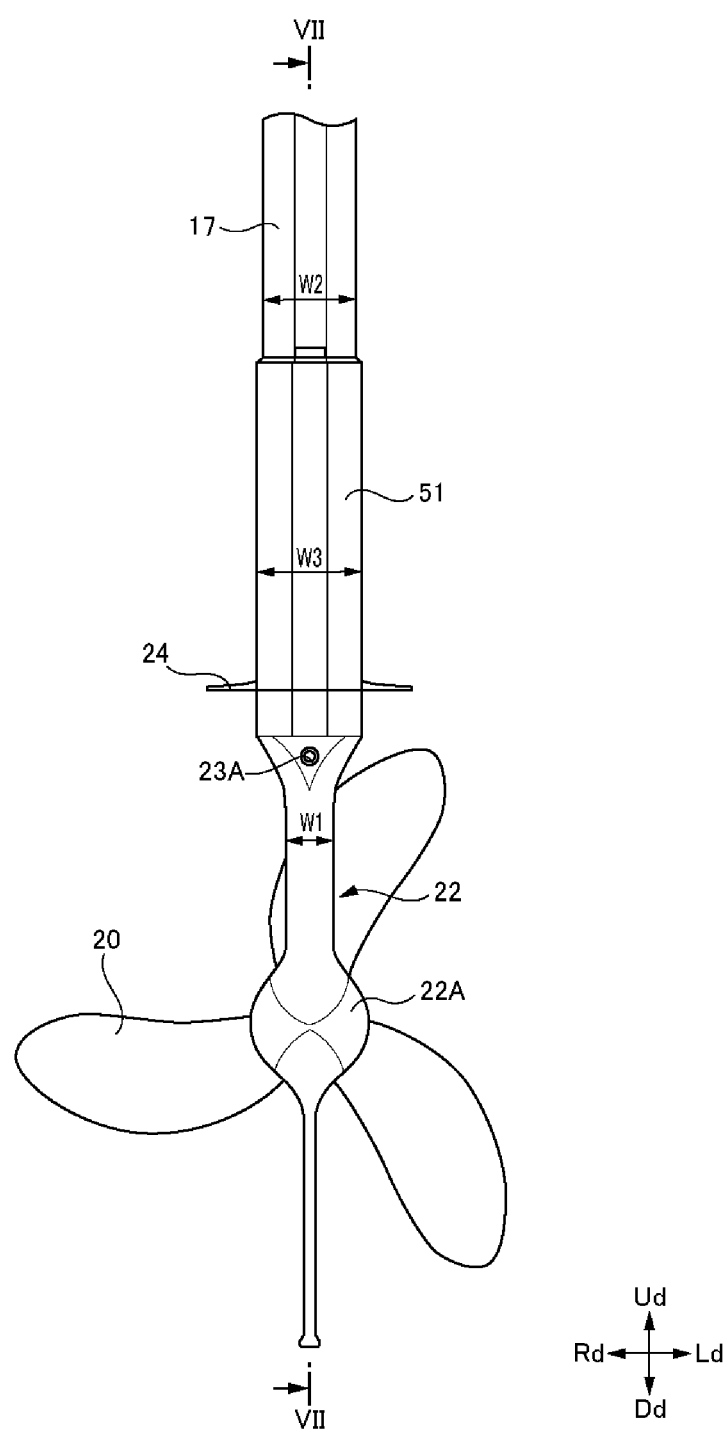
FIG. 2 is an external view showing a part from an intermediate portion to a lower portion in an upper-lower direction of the outboard motor according to the embodiment of the present invention as viewed from the front.

FIG. 1 shows an outboard motor 11 according to an embodiment of the present invention as viewed from the right. FIG. 2 shows a part of the outboard motor 11 from an intermediate portion to a lower portion in an upper-lower direction, as viewed from the front. In FIG. 1, the outboard motor 11 is a device that propels a boat 5, and is attached to a transom 6 at a rear portion of the boat 5. The outboard motor 11 of the present embodiment is an electric outboard motor using an electric motor 12 as a power source, and is a low-output outboard motor suitable for a small boat 5.

The outboard motor 11 includes the electric motor 12 and an inverter 13 which controls driving of the electric motor 12. The inverter 13 is disposed above the electric motor 12. Further, the outboard motor 11 includes a motor case 14 which covers the electric motor 12 and an inverter case 15 which covers the inverter 13.

The electric motor 12, the inverter 13, the motor case 14, and the inverter case 15 are disposed at an upper portion of the outboard motor 11. In a state where the outboard motor 11 is attached to the boat 5 as shown in FIG. 1, the electric motor 12, the inverter 13, the motor case 14, and the inverter case 15 are located above a water surface position P1 when the boat 5 stops or navigates at a low speed and are located above the transom 6 of the boat 5.

Further, the outboard motor 11 includes a drive shaft 16 which transmits power of the electric motor 12 to a propeller 20, and a drive shaft housing 17 which covers the drive shaft 16. The drive shaft 16 is located below the electric motor 12 and extends in the upper-lower direction. An upper end side of the drive shaft 16 is connected to an output shaft of the electric motor 12, and the drive shaft 16 is rotated by power of the electric motor 12. The drive shaft housing 17 is formed in a tubular shape elongated in the upper-lower direction. Further, the outboard motor 11 is provided with a clamp bracket 18 which fixes the outboard motor 11 to the transom 6 of the boat 5, and a swivel bracket 19 which supports the outboard motor 11 so as to be swingable in a left-right direction with respect to the boat 5. Further, the swivel bracket 19 can rotate in the upper-lower direction with respect to the clamp bracket 18 around a tilt shaft K in FIG. 1, and thus the outboard motor 11 can be tilted with respect to the boat 5.

The clamp bracket 18 and the swivel bracket 19 are disposed above the intermediate portion of the outboard motor 11 in the upper-lower direction. In a state where the outboard motor 11 is attached to the boat 5, the clamp bracket 18 and the swivel bracket 19 are located above the water surface position P1 when the boat 5 stops or navigates at a low speed.

Meanwhile, a lower end portion of the drive shaft housing 17 is located at a lower side of the intermediate portion in the upper-lower direction of the outboard motor 11. In a state where the outboard motor 11 is attached to the boat 5, the lower end portion of the drive shaft housing 17 is located above a water surface position P2 when the boat 5 navigates at a high speed, but the lower end portion of the drive shaft housing 17 may also be located at the same position as or below the water surface position P1 when the boat 5 stops or navigates at a low speed.

Further, the outboard motor 11 includes the propeller 20 which generates a propulsive force for propelling the boat 5, a gear mechanism 21 which transmits rotation of the drive shaft 16 to the propeller 20, and a gear case 22 which accommodates the gear mechanism 21 and rotatably supports the propeller 20. A lower end side of the drive shaft 16 enters the gear case 22 from above, and is connected to the gear mechanism 21.

The gear case 22 which accommodates the gear mechanism 21 and rotatably supports the propeller 20 is disposed at a lower portion of the outboard motor 11. In a state where the outboard motor 11 is attached to the boat 5, the gear case 22, the gear mechanism 21, and the propeller 20 are located below the water surface position P2 when the boat 5 navigates at a high speed.

Further, the outboard motor 11 includes an anti-ventilation plate 24 which prevents inflow of air from the water surface into the propeller 20. The anti-ventilation plate 24 is disposed at the lower portion of the outboard motor 11 and above blades of the propeller 20. A position of the anti-ventilation plate 24 in the upper-lower direction is set to be the same as the water surface position P2 when the boat 5 navigates at a high speed. In the present embodiment, the anti-ventilation plate 24 is disposed immediately above an upper end portion of the gear case 22.

Further, as shown in FIG. 2, when the gear case 22 is viewed from the front thereof, a part of the gear case 22 from the upper end portion (a position immediately below a part where the anti-ventilation plate 24 is disposed) to a gear mechanism accommodating portion 22A where the gear mechanism 21 is accommodated has a narrowly constricted shape. In the gear case 22, a dimension W1 in the left-right direction of the part from the upper end portion of the gear case 22 to the gear mechanism accommodating portion 22A is smaller than both a dimension W2 of the drive shaft housing 17 in the left-right direction and a dimension W3 of a heat sink 51 in the left-right direction.

(Cooling Device)

Figure 3:
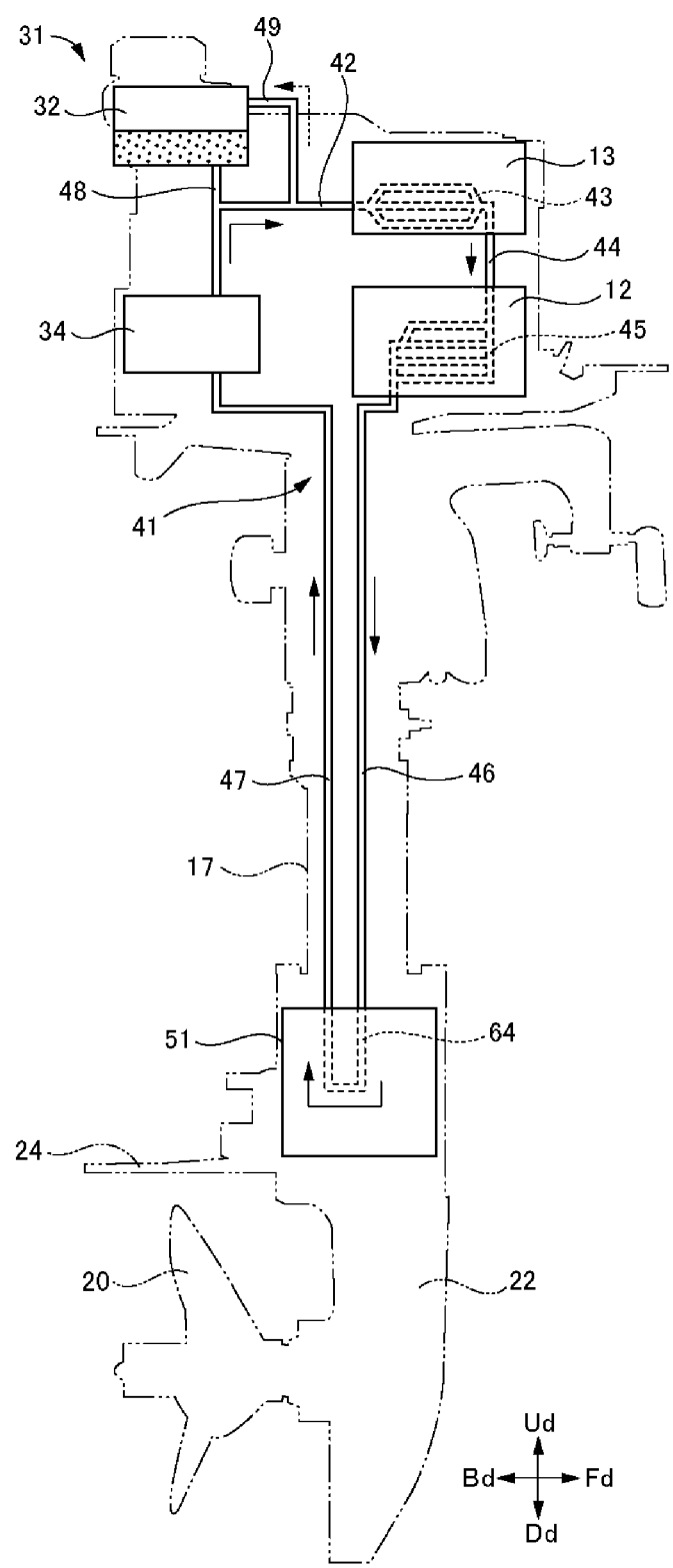
FIG. 3 is an explanatory diagram showing a configuration of a cooling device provided in the outboard motor according to the embodiment of the present invention.
Figure 4:
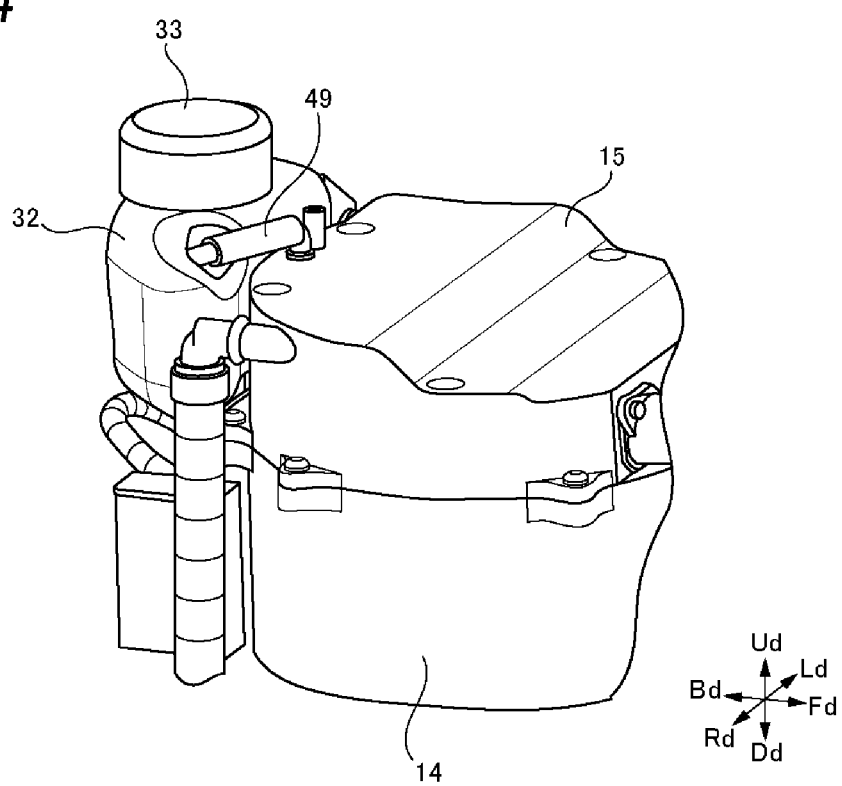
FIG. 4 is a perspective view showing an upper rear side of the outboard motor according to the embodiment of the present invention.

FIG. 3 shows a configuration of a cooling device 31 of the outboard motor 11. FIG. 4 shows an upper rear side of the outboard motor 11. In FIG. 3, the outboard motor 11 includes the cooling device 31 for cooling the electric motor 12 and the inverter 13. The cooling device 31 cools the electric motor 12 and the inverter 13 using cooling water as a cooling liquid. The cooling water is, for example, an antifreeze solution containing ethylene glycol as a main component.

The cooling device 31 includes a tank 32 which stores the cooling water, the heat sink 51 which cools the cooling water, a cooling water passage 41 which connects the inverter 13, the electric motor 12, and the heat sink 51 such that the cooling water circulates through the inverter 13, the electric motor 12, and the heat sink 51, and a pump 34 which pumps the cooling water to circulate through the inverter 13, the electric motor 12, and the heat sink 51 via the cooling water passage 41.

As shown in FIG. 4, the tank 32 is disposed at the upper portion of the outboard motor 11. Specifically, the tank 32 is disposed at a rear portion of an uppermost portion of the outboard motor 11 and is located behind the inverter case 15. The tank 32 is formed of, for example, a resin material in a box shape. An injection port for injecting cooling water is formed in an upper portion of the tank 32. A tank cap 33 for closing the injection port is detachably attached to the upper portion of the tank 32.

As shown in FIG. 1, the pump 34 is disposed at the upper portion of the outboard motor 11. Specifically, the pump 34 is disposed below the tank 32 and behind the motor case 14.

In a state where the outboard motor 11 is attached to the boat 5, the tank 32 and the pump 34 are located above the water surface position P1 when the boat 5 stops or navigates at a low speed and above the transom 6 of the boat 5.

As shown in FIG. 1, the heat sink 51 is disposed in the outboard motor 11 at a position lower than the electric motor 12 and higher than the gear case 22. Specifically, the heat sink 51 is disposed between the drive shaft housing 17 and the gear case 22. The heat sink 51 is disposed at an upper portion of or above the anti-ventilation plate 24. In a state where the outboard motor 11 is attached to the boat 5 as shown in FIG. 1, the heat sink 51 is located below the water surface position P1 when the boat 5 stops or navigates at a low speed. Further, most of the heat sink 51 is located above the water surface position P2 when the boat 5 navigates at a high speed (a part of the heat sink 51 on a lower end side thereof may be located below the water surface position P2 when the boat 5 navigates at a high speed).

As shown in FIG. 3, the cooling water passage 41 includes a transport passage 42 through which the cooling water is transported from the pump 34 to the inverter 13, an internal passage 43 through which the cooling water flows around or inside the inverter 13 so as to cool the inverter 13, a transport passage 44 through which the cooling water is transported from the inverter 13 to the electric motor 12, an internal passage 45 through which the cooling water flows around or inside the electric motor 12 so as to cool the electric motor 12, a cooling water pipe 46 as a transport passage through which the cooling water is transported from the electric motor 12 to the heat sink 51, a cooling water pipe 47 as a transport passage through which the cooling water is transported from the heat sink 51 to the pump 34, and a supply passage 48 through which the cooling water is supplied from the tank 32 to the transport passage 42 when the cooling water is insufficient. The cooling water passage 41 is a specific example of a cooling liquid passage, and the cooling water pipes 46, 47 are a specific example of a first tubular member and a specific example of a second tubular member, respectively.

The cooling water passage 41 has, as a whole, a closed loop structure including the transport passage 42, the internal passage 43, the transport passage 44, the internal passage 45, the cooling water pipe 46, a cooling pipeline 64 in the heat sink 51 to be described later, and the cooling water pipe 47.

Each of the transport passages 42, 44 and the supply passage 48 is formed of, for example, a pipe or a hose. The internal passage 43 is formed by, for example, a passage (water jacket) or the like formed in a wall portion forming an outline of the inverter 13. The internal passage 45 is formed by, for example, a passage (water jacket) or the like formed in a wall portion forming an outline of the electric motor 12. Each of the cooling water pipes 46, 47 is, for example, a pipe made of resin or metal.

The cooling water stored in the tank 32 flows into the transport passage 42 and the like due to gravity. When the pump 34 is operated, the cooling water circulates in the transport passage 42, the internal passage 43, the transport passage 44, the internal passage 45, the cooling water pipe 46, the cooling pipeline 64 in the heat sink 51, and the cooling water pipe 47 in this order (see solid arrows in FIG. 3).

Further, the cooling device 31 includes an air vent passage 49 for allowing air in the cooling water passage 41 to escape to an outside of the cooling water passage 41. It is preferable that one end side of the air vent passage 49 is connected to a part disposed at a highest position in the cooling water passage 41. In the present embodiment, as shown in FIG. 3, one end side of the air vent passage 49 is connected in the middle of the transport passage 42. Further, as shown in FIG. 4, the other end side of the air vent passage 49 is connected to the upper portion of the tank 32. The other end portion of the air vent passage 49 is opened to a space in the tank 32 which is above a water surface of the cooling water stored in the tank 32. The air vent passage 49 is formed of, for example, a pipe or a hose. The air in the cooling water passage 41 is discharged to the upper space in the tank 32 through the air vent passage 49 (see a dashed arrow in FIG. 3).

(Cooling Water Pipe and Heat Sink)

Figure 5:
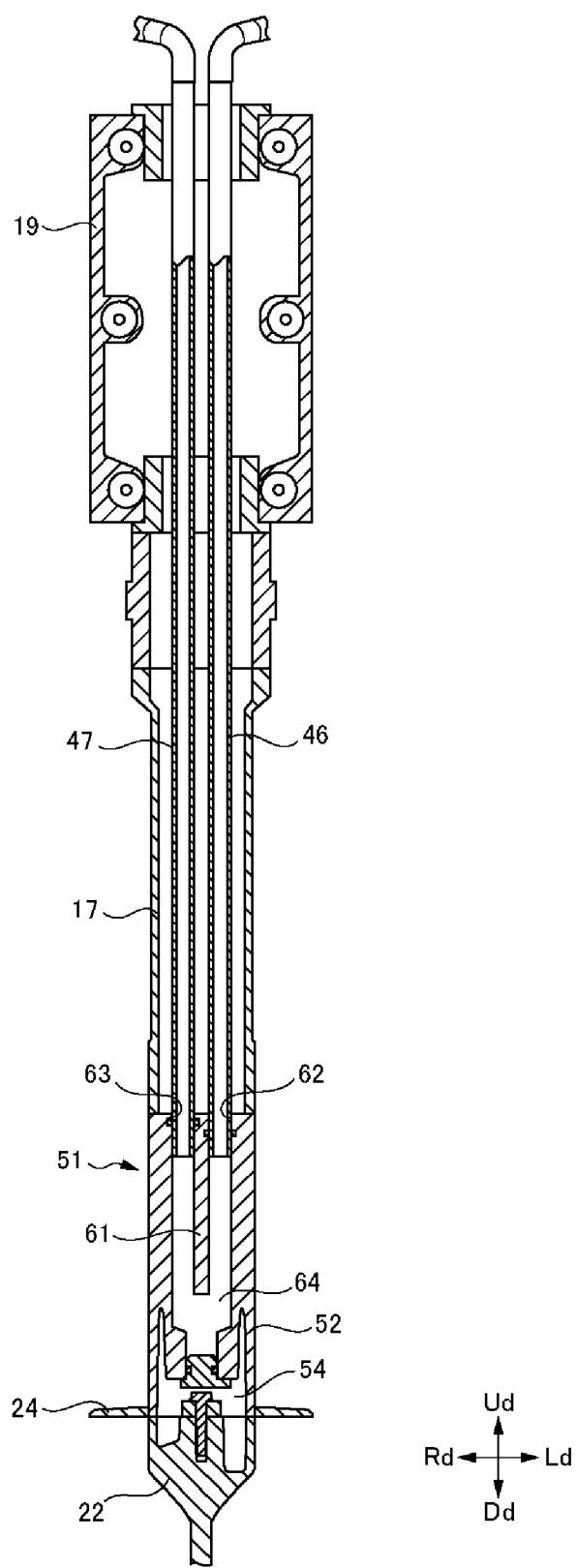
FIG. 5 is a cross-sectional view showing a state in which a cross section of a swivel bracket, a drive shaft housing, a cooling water pipe, a heat sink, and the like taken along a cutting line V-V in FIG. 1 is viewed from the front (right side of a paper in FIG. 1).
Figure 6:
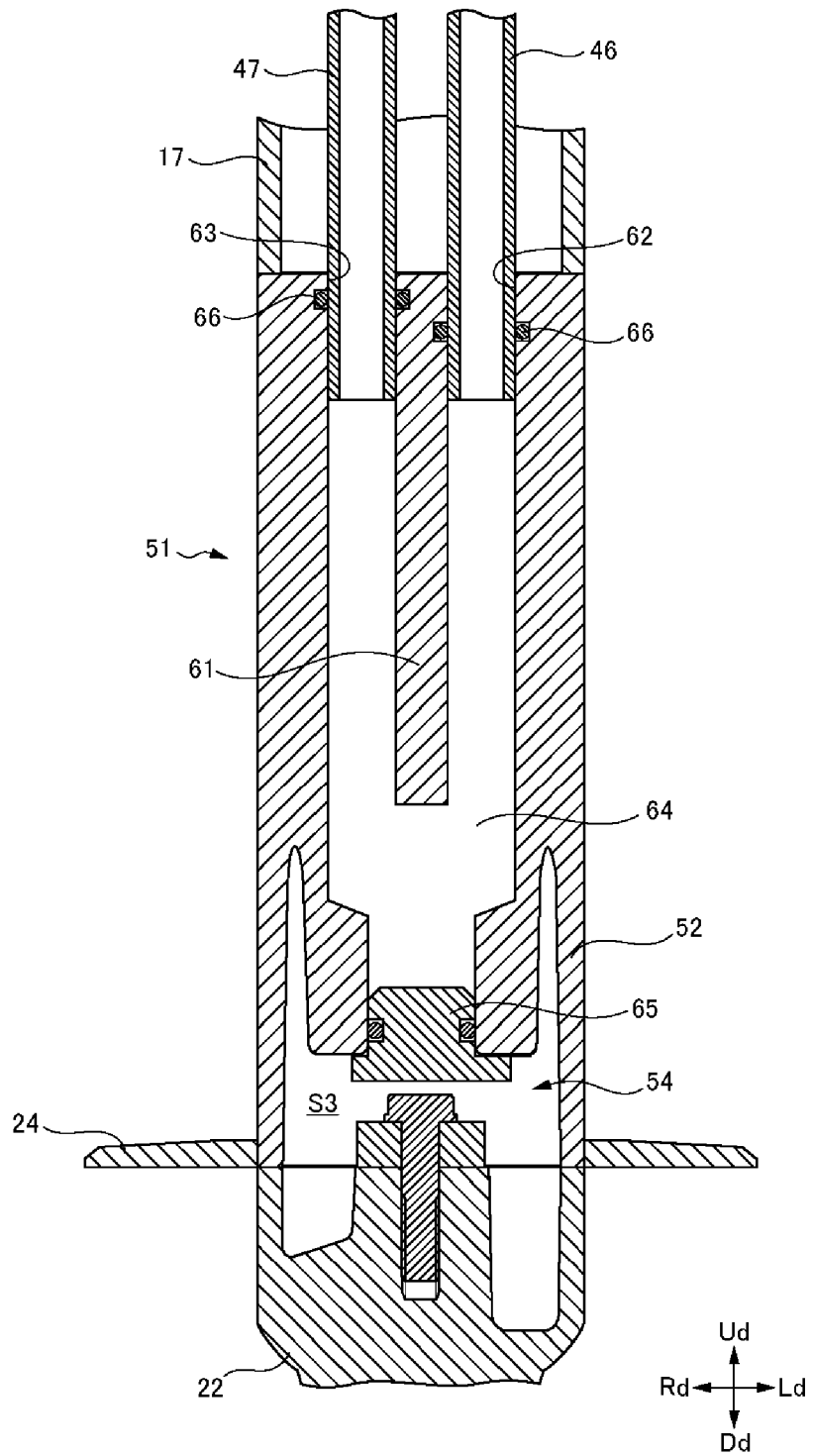
FIG. 6 is an enlarged cross-sectional view showing the heat sink and the like in FIG. 5.
Figure 7:
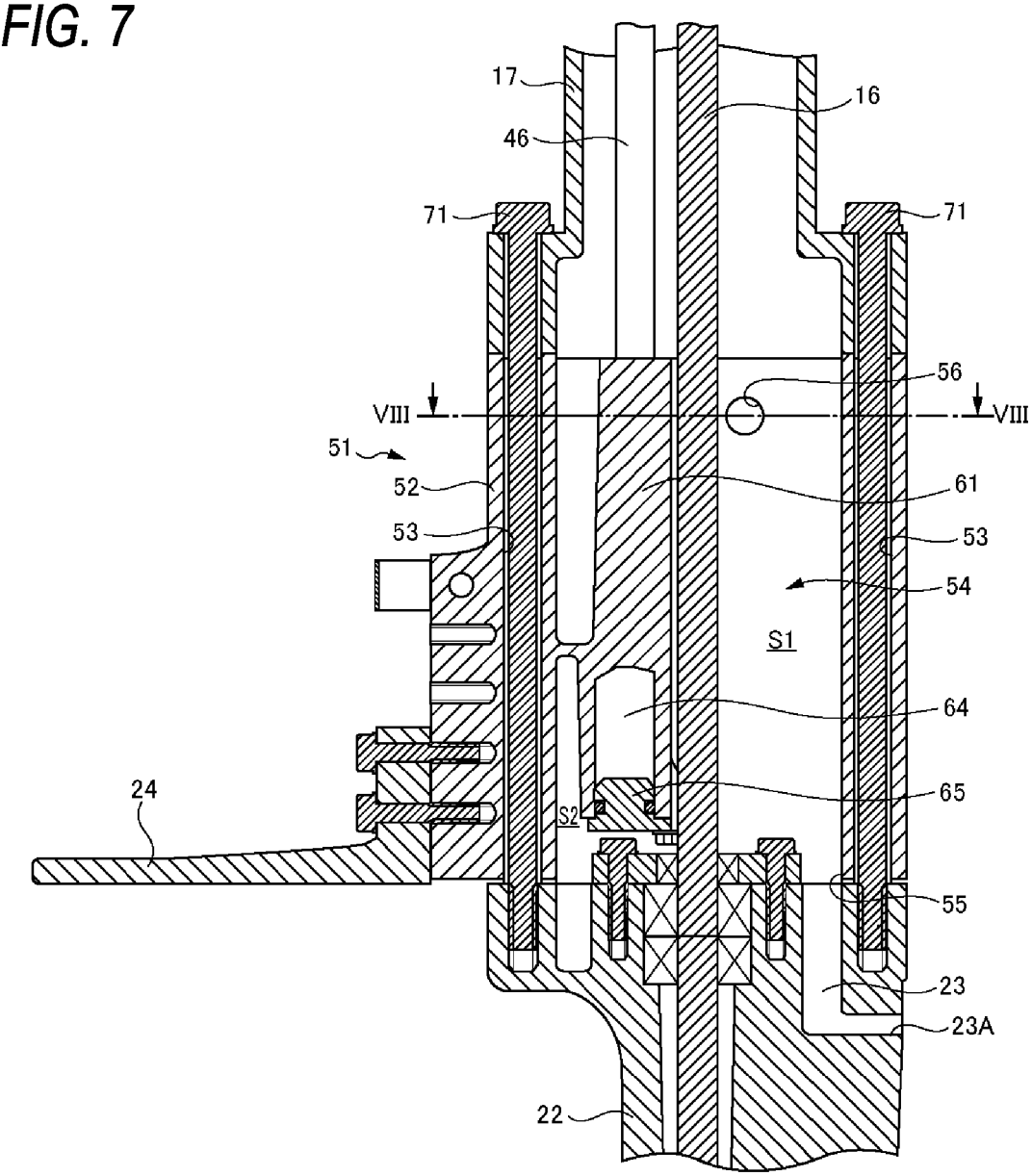
FIG. 7 is a cross-sectional view showing a state in which a cross section of the heat sink and the like taken along a cutting line VII-VII in FIG. 2 is viewed from the right (left side of a paper in FIG. 2).
Figure 7:
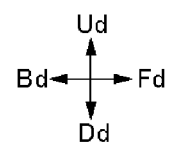
Figure 8:
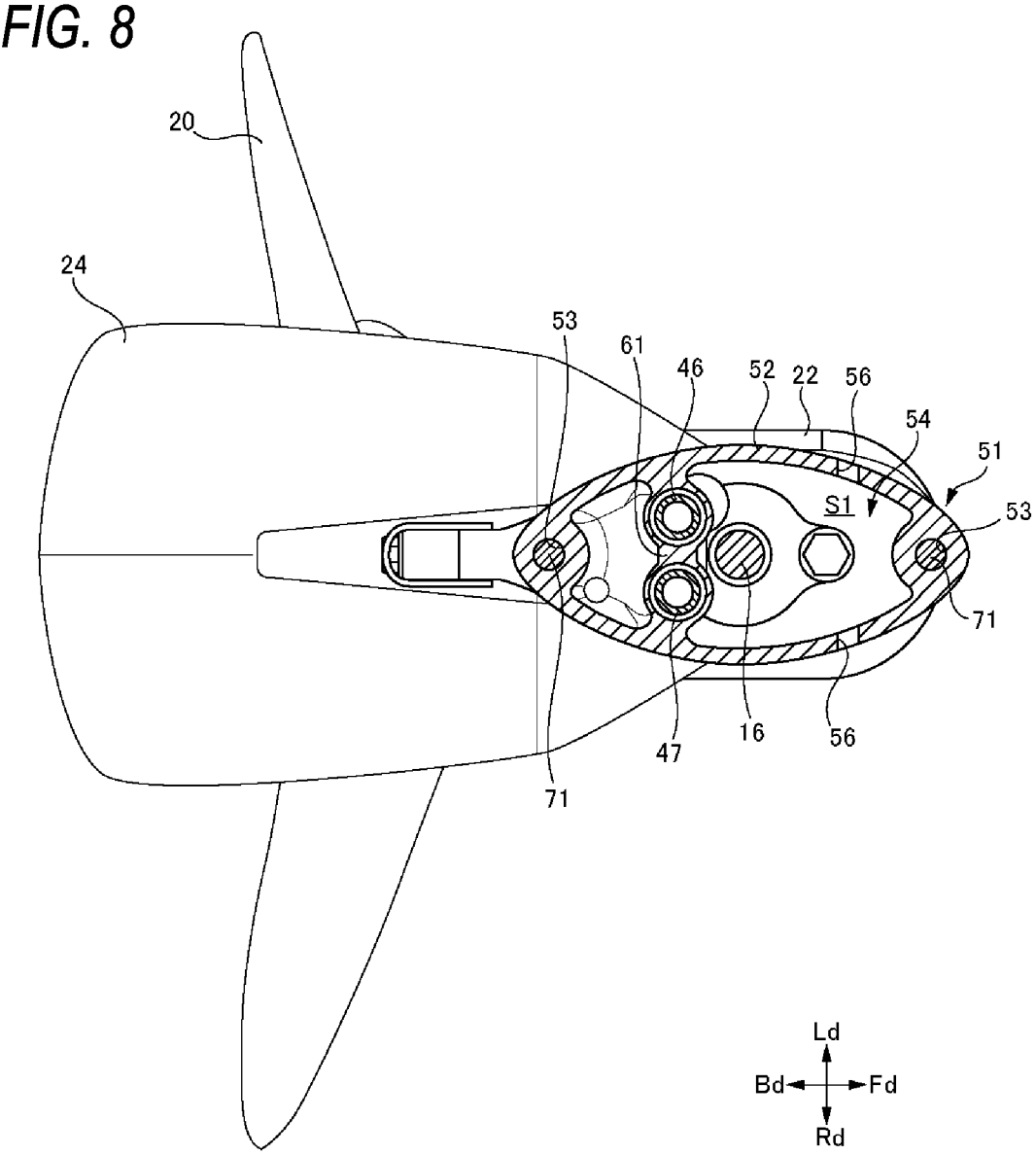
FIG. 8 is a cross-sectional view showing a state in which a cross section of the heat sink taken along a cutting line VIII-VIII in FIG. 7 and the like are viewed from the above.

FIG. 5 shows a state in which a cross section of the swivel bracket 19, the drive shaft housing 17, the cooling water pipes 46, 47, the heat sink 51, and the like taken along a cutting line V-V in FIG. 1 is viewed from the front (right side of a paper in FIG. 1). FIG. 6 shows an enlarged cross section of the heat sink 51 and the like in FIG. 5. FIG. 7 shows a state in which a cross section of the heat sink 51 and the like taken along a cutting line VII-VII in FIG. 2 is viewed from the right (left side of a paper in FIG. 2). FIG. 8 shows a state in which a cross section of the heat sink 51 taken along a cutting line VIII-VIII in FIG. 7 and the like are viewed from the above.

As shown in FIG. 5, the two cooling water pipes 46, 47 which configure a part of the cooling water passage 41 are formed by long pipes extending in the upper-lower direction. The cooling water pipes 46, 47 penetrate the drive shaft housing 17 and reach the heat sink 51 from the upper portion of the outboard motor 11. In the drive shaft housing 17, the cooling water pipes 46, 47 are arranged parallel to each other in the left-right direction, and are disposed behind the drive shaft 16.

As shown in FIG. 7, the heat sink 51 includes a heat sink case 52 and a heat sink main body 61. The heat sink case 52 and the heat sink main body 61 are integrally formed of a material having an excellent heat dissipation property, such as aluminum.

The heat sink case 52 is formed in a tubular shape or a box shape having upper and lower opening portions. Bolt insertion holes 53 are respectively formed in a front portion and a rear portion of a peripheral wall portion of the heat sink case 52 so as to penetrate these portions in the upper-lower direction. The heat sink case 52 is fixed between the drive shaft housing 17 and the gear case 22 by bolts 71 inserted into the bolt insertion holes 53. Further, by removing the bolts 71, the gear case 22 can be separated from the heat sink 51, and the heat sink 51 can be separated from the drive shaft housing 17.

The heat sink main body 61 is provided in the heat sink case 52. As shown in FIG. 6, the heat sink main body 61 includes a cooling water inlet 62 located on one side in the left-right direction of an upper portion of the heat sink case 52, a cooling water outlet 63 located on the other side in the left-right direction of the upper portion of the heat sink case 52, and the U-shaped cooling pipeline 64 in which one end portion communicates with the cooling water inlet 62, the other end portion communicates with the cooling water outlet 63, and an intermediate portion is located in a lower portion of the heat sink case 52. In the present embodiment, so as to facilitate molding of the heat sink 51 and the like, the cooling pipeline 64 is formed by liquid-tightly closing, by a closing member 65, a lowermost portion of a hole in which an upper side is divided into two and a lower side is combined into one.

A lower end portion of the cooling water pipe 46 is connected to the cooling water inlet 62 in the heat sink main body 61. Specifically, the lower end portion of the cooling water pipe 46 is inserted into the cooling water inlet 62, and a gap between the cooling water inlet 62 and the lower end portion of the cooling water pipe 46 is liquid-tightly sealed by a seal 66 such as an O-ring. Further, a lower end portion of the cooling water pipe 47 is connected to the cooling water outlet 63. Specifically, the lower end portion of the cooling water pipe 47 is inserted into the cooling water outlet 63, and a gap between the cooling water outlet 63 and the lower end portion of the cooling water pipe 47 is liquid-tightly sealed by a seal 66 such as an O-ring. The cooling water inlet 62 is a specific example of a cooling liquid inlet, and the cooling water outlet 63 is a specific example of a cooling liquid outlet.

Further, the drive shaft 16 penetrates inside the heat sink case 52. The drive shaft 16 extends in the upper-lower direction at a center in the heat sink case 52. The heat sink main body 61 is disposed behind the drive shaft 16.

The cooling water passes through the cooling water pipe 46 from the electric motor 12, and flows into the cooling pipeline 64 from the cooling water inlet 62. Thereafter, the cooling water flows through the cooling pipeline 64, flows out from the cooling water outlet 63, enters the cooling water pipe 47, and reaches the pump 34 through the cooling water pipe 47.

As shown in FIG. 7, the heat sink case 52 includes a flow chamber 54 through which water (seawater, lake water, or the like) around the boat 5 flows so as to cool the heat sink main body 61, an intake port 55 through which water around the boat 5 is taken into the flow chamber 54, and a discharge port 56 through which the water flows through the flow chamber 54 is discharged to an outside of the flow chamber 54.

In the heat sink case 52, a space S1 is formed in front of the heat sink main body 61 and the drive shaft 16, a space S2 is formed behind a lower portion of the heat sink main body 61, and a space S3 is formed below the heat sink main body 61 as shown in FIG. 6. These spaces S1, S2, and S3 communicate with one another. The flow chamber 54 is formed by these spaces S1, S2, and S3.

As shown in FIG. 7, the intake port 55 is formed by an opening portion on a lower side of a front portion of the heat sink case 52. The intake port 55 communicates with the flow chamber 54 of the heat sink case 52. The gear case 22 is provided with an introduction path 23 through which water around the boat 5 is introduced into the intake port 55. An opening portion 23A on one end portion of the introduction path 23 is opened in a front upper portion of the gear case 22, and the other end portion of the introduction path 23 communicates with the intake port 55. The opening portion 23A of the introduction path 23 is located below the water surface position P2 (see FIG. 1) when the boat 5 navigates at a high speed.

The discharge port 56 is disposed at a position close to a front of the upper portion of the heat sink case 52. There are two discharge ports 56, and as shown in FIG. 8, the two discharge ports 56 are respectively disposed in a left portion and a right portion of the heat sink case 52. The flow chamber 54 communicates with an outside of the heat sink case 52 via the discharge ports 56.

During navigation of the boat 5, water around the boat 5 flows into the flow chamber 54 through the introduction path 23 and the intake port 55. The water flowing into the flow chamber 54 flows through the spaces S1, S2, and S3, and is then discharged from the discharge ports 56 to the outside of the heat sink case 52. Therefore, the heat sink main body 61 is cooled, and the cooling water flowing in the cooling pipeline 64 of the heat sink main body 61 is cooled. Further, the cooling of the cooling water by the heat sink 51 is performed not only by the water flowing in the flow chamber 54 formed in the heat sink case 52 but also by the water flowing outside the heat sink case 52. That is, an effect of cooling the cooling water by the heat sink 51 can be obtained by immersing the heat sink case 52 in water when the boat 5 stops or navigates at a low speed, or by splashing the heat sink case 52 with water when the boat 5 navigates at a high speed.

As described above, in the outboard motor 11 according to the embodiment of the present invention, the tank 32 and the pump 34 are disposed in the upper portion of the outboard motor 11, the heat sink 51 is disposed above the gear case 22, and the cooling water passage 41 is disposed above the gear case 22. Thus, excluding the introduction path 23, none of the elements configuring the cooling device 31 is disposed in the gear case 22. Therefore, as shown in FIG. 2, the gear case 22 can be downsized or slimed. Specifically, in the gear case 22, the dimension W1 in the left-right direction of the part from the upper end portion of the gear case 22 to the gear mechanism accommodating portion 22A can be smaller than both the dimension W2 of the drive shaft housing 17 in the left-right direction and the dimension W3 of the heat sink 51 in the left-right direction. Accordingly, water resistance during navigation of the boat 5 can be reduced, and the navigation performance of the boat 5 can be improved.

Further, since none of the elements configuring the cooling device 31 is disposed in the gear case 22 excluding the introduction path 23, a structure in which the gear case 22 is detachable relative to the outboard motor 11 can be easily realized. According to the present embodiment, as shown in FIG. 7, the gear case 22 can be easily separated from the outboard motor 11 by removing the two bolts 71. Further, the gear case 22 can be easily attached to the outboard motor 11 by using the two bolts 71. Therefore, an operation such as maintenance of the gear mechanism 21 accommodated in the gear case 22 or the propeller 20 supported by the gear case 22 can be easily performed.

In the present embodiment, the heat sink 51 can be easily attached to and detached from the outboard motor 11. That is, by removing the two bolts 71, the heat sink 51 can be easily separated from the drive shaft housing 17, and the heat sink 51 can be easily attached to the drive shaft housing 17 using these bolts 71. Further, the lower end portions of the cooling water pipes 46, 47 can be easily inserted into and pulled out from the cooling water inlet 62 and the cooling water outlet 63 of the heat sink 51. Therefore, when the heat sink 51 is to be separated from the drive shaft housing 17, the two bolts 71 are removed, then the cooling water pipes 46, 47 are pulled out from the cooling water inlet 62 and the cooling water outlet 63 while the heat sink 51 is moved downward, and thus the connection between the cooling water pipes 46, 47 and the cooling water inlet 62 and the cooling water outlet 63 can be easily released. Further, when the heat sink 51 is to be attached to the drive shaft housing 17, the cooling water pipes 46, 47 are inserted into the cooling water inlet 62 and the cooling water outlet 63 while the heat sink 51 is moved upward from below the drive shaft housing 17, and thus the cooling water pipes 46, 47 can be easily connected to the cooling water inlet 62 and the cooling water outlet 63.

In the outboard motor 11 of the present embodiment, the heat sink 51 is located higher than the gear case 22 and closer to the clamp bracket 18 than the gear case 22. Therefore, as compared with a case where the heat sink 51 is disposed in the gear case 22, a user is less likely to feel the weight when the outboard motor 11 is tilted. Therefore, a burden of an operation of tilting the outboard motor 11 can be reduced.

Further, in the outboard motor 11 of the present embodiment, the heat sink 51 is disposed between the drive shaft housing 17 and the gear case 22. The heat sink 51 is disposed at the upper portion of or above the anti-ventilation plate 24. With such a configuration, the heat sink 51 sinks in seawater or lake water when the boat 5 stops or navigates at a low speed, and the heat sink 51 is splashed with water when the boat 5 navigates at a high speed, so that the heat sink 51 can be cooled, and the cooling water flowing in the heat sink 51 can be cooled. As described above, according to the outboard motor 11 of the embodiment of the present invention, the cooling water can be easily cooled by using seawater, lake water, or the like while downsizing or sliming the gear case 22 and realizing easy attachment and detachment of the gear case 22 to and from the outboard motor 11.

Further, in the outboard motor 11 of the present embodiment, the heat sink main body 61 can be cooled by seawater, lake water, or the like flowing in the flow chamber 54 formed in the heat sink case 52. As a result, the performance of cooling the cooling water by the heat sink 51 can be improved. Further, according to the outboard motor 11 of the embodiment of the present invention, since seawater, lake water, or the like is configured to be introduced into the flow chamber 54 via the introduction path 23 opened at the front upper portion of the gear case 22, seawater, lake water, or the like can be reliably taken into the flow chamber 54, and an amount of seawater, lake water, or the like flowing in the flow chamber 54 can be increased.

Further, in the outboard motor 11 of the present embodiment, the discharge ports 56 are disposed at positions closer to the front of the upper left portion and the upper right portion of the heat sink case 52. Therefore, when seawater, lake water, or the like taken into the flow chamber 54 is discharged from the discharge ports 56 to the outside of the heat sink case 52, the seawater or lake water is discharged from the upper portion of the heat sink case 52 to a left front side and a right front side, respectively. Therefore, the user can easily confirm from above the boat 5 that seawater or lake water is flowing through the flow chamber 54 of the heat sink case 52. Therefore, the user can easily know whether the introduction path 23, the intake port 55, the flow chamber 54, or each discharge port 56 are blocked by dust or the like in seawater or lake water, and can easily determine whether maintenance is necessary.

Further, in the outboard motor 11 of the present embodiment, the two cooling water pipes 46, 47 provided in the drive shaft housing 17 and the U-shaped cooling pipeline 64 provided in the heat sink case 52 form a structure in which the cooling water is sent from the upper portion of the outboard motor 11 to the heat sink 51 and the cooling water is returned from the heat sink 51 to the upper portion of the outboard motor 11. With such a circulation structure of the cooling water, the electric motor 12 and the inverter 13 can be efficiently cooled.

Further, according to the outboard motor 11 of the present embodiment, since the internal passage 43 through which the cooling water flows around or inside the inverter 13 is provided in addition to the internal passage 45 through which the cooling water flows around or inside the electric motor 12, both the electric motor 12 and the inverter 13 can be cooled, and a performance of the electric outboard motor can be improved.

In the present embodiment, the tank 32 is disposed at the rear portion of the uppermost portion of the outboard motor 11. Therefore, it is difficult for a water surface of the cooling water stored in the tank 32 to reach the tank cap 33 not only at the time of general navigation in which the boat navigates in a state where the outboard motor 11 is not tilted up, but also at the time of navigation in a shallow. The outboard motor 11 is tilted up when the boat navigates a shallow. Therefore, leakage of the cooling water from the tank 32 can be prevented.

Further, according to the outboard motor 11 of the present embodiment, by providing the air vent passage 49 between the transport passage 42 disposed at a highest position in the cooling water passage 41 and the tank 32, air in the cooling water passage 41 having the closed loop structure can be released to the outside of the cooling water passage 41.

In the above embodiment, the cooling water pipes 46, 47 are used as the transport passage through which the cooling water is pumped from the electric motor 12 to the heat sink 51 and the transport passage through which the cooling water is pumped from the heat sink 51 to the pump 34, but hoses may be used as these transport passages, or these transport passages may be formed by providing holes in the drive shaft housing 17.

The positional relationship between the cooling water pipes 46, 47 and the drive shaft 16 in the drive shaft housing 17 and the positional relationship between the flow chamber 54 and the drive shaft 16 in the heat sink case 52 are not limited to those described in the embodiment. Further, in the above-described embodiment, a case in which seawater, lake water, or the like is introduced into the intake port 55 of the heat sink case 52 via the introduction path 23 formed in the gear case 22 has been described as an example, but for example, an intake port may be disposed in a peripheral wall at the lower portion of the heat sink case 52 and seawater, lake water, or the like may flow directly into the flow chamber 54 from the intake port.

An order in which the cooling water circulates in the electric motor 12, the inverter 13, the heat sink 51, and the pump 34 is not limited. The cooling liquid used by the cooling device 31 is not limited to the cooling water described in the above-described embodiment, and may be, for example, oil.

In the electric outboard motor 11, an object to be cooled by the cooling device 31 is not limited to the electric motor 12 and the inverter 13. For example, a battery may be cooled. Further, in the upper portion of the outboard motor 11, the arrangement of the electric motor 12, the inverter 13, the tank 32, and the pump 34 can be changed.

The present invention is not limited to a low-output outboard motor, and can also be applied to a high-output outboard motor. Further, the present invention is not limited to the electric outboard motor, and can also be applied to an outboard motor using an internal combustion engine as a power source. Further, the present invention is not limited to the outboard motor, and can also be applied to boat propulsion machines of other types such as an inboard/outboard motor.

The present invention can be modified as appropriate without departing from the scope or spirit of the invention which can be read from the claims and the entire specification, and the boat propulsion machine to which such a change is applied is also included in the technical concept of the present disclosure.

What is claimed is:

1. A boat propulsion machine that propels a boat, comprising:
   a power source;
   a drive shaft configured to be rotated by power of the power source;
   a propeller configured to generate a propulsive force for propelling the boat;
   a gear mechanism configured to transmit rotation of the drive shaft to the propeller;
   a gear case accommodating the gear mechanism and rotatably supporting the propeller;
   a tank configured to store a cooling liquid for cooling the power source;
   a heat sink configured to cool the cooling liquid;
   an anti-ventilation plate;
   a cooling liquid passage connecting the power source and the heat sink such that the cooling liquid circulates between the power source and the heat sink; and
   a pump configured to pump the cooling liquid to circulate through the cooling liquid passage between the power source and the heat sink, wherein
   the power source, the tank, and the pump are provided at an upper portion of the boat propulsion machine,
   the gear case is provided at a lower portion of the boat propulsion machine,
   the drive shaft extends in an upper-lower direction between the power source and the gear mechanism,
   the heat sink is provided at a position lower than the power source and higher than the gear case in the boat propulsion machine, and
   the heat sink is disposed at an upper portion of the anti-ventilation plate or above the anti-ventilation plate.

2. The boat propulsion machine according to claim 1, wherein
   the power source is an electric motor, an inverter configured to control driving of the electric motor is provided at the upper portion of the boat propulsion machine, and the cooling liquid passage passes around or inside the inverter so as to cool the inverter with the cooling liquid.

3. The boat propulsion machine according to claim 1, further comprising:

a drive shaft housing covering an outer peripheral side of the drive shaft, wherein
the heat sink is provided between the drive shaft housing and the gear case.

4. The boat propulsion machine according to claim 3, wherein
the heat sink includes a box-shaped or tubular heat sink case and a heat sink main body provided in the heat sink case,
the heat sink main body includes a cooling liquid inlet located in an upper portion of the heat sink case, a cooling liquid outlet located in the upper portion of the heat sink case, and a U-shaped cooling pipeline in which one end portion communicates with the cooling liquid inlet, the other end portion communicates with cooling liquid outlet, and an intermediate portion is located in a lower portion of the heat sink case,
the cooling liquid passage includes a first tubular member through which the cooling liquid is pumped from the upper portion of the boat propulsion machine to the heat sink, and a second tubular member through which the cooling liquid is pumped from the heat sink to the upper portion of the boat propulsion machine, and
the first tubular member and the second tubular member are provided in the drive shaft housing, a lower end portion of the first tubular member is connected to the cooling liquid inlet, and a lower end portion of the second tubular member is connected to the cooling liquid outlet.

5. The boat propulsion machine according to claim 4, wherein
the heat sink case includes a flow chamber which is formed in the heat sink case and in which water around the boat flows to cool the heat sink main body, an intake port through which water around the boat is taken into the flow chamber, and a discharge port through which water flowing in the flow chamber is discharged to an outside of the flow chamber.

6. The boat propulsion machine according to claim 5, wherein
the gear case is provided with an introduction path in which one end is opened in a front upper portion of the gear case and the other end communicates with the intake port, and which introduces water around the boat into the intake port.

7. The boat propulsion machine according to claim 1, further comprising:
an air vent passage configured to vent air in the cooling liquid passage, wherein
one end side of the aft vent passage is connected to the cooling liquid passage, and the other end side of the air vent passage is connected to the tank.

* * * * *